March 10, 1959  G. H. BIRCHALL, JR., ET AL  2,876,985
ROTARY VALVES FOR LABORATORY GLASSWARE AND THE LIKE
Filed June 22, 1955  2 Sheets-Sheet 1

INVENTOR.
GEORGE H. BIRCHALL, JR.
JAMES A. PURDY.
BY
Leonard L. Kalish
ATTORNEY.

March 10, 1959  G. H. BIRCHALL, JR., ET AL  2,876,985
ROTARY VALVES FOR LABORATORY GLASSWARE AND THE LIKE
Filed June 22, 1955  2 Sheets-Sheet 2

INVENTOR.
GEORGE H. BIRCHALL JR.
JAMES A. PURDY.
BY
Leonard L. Kalish
ATTORNEY.

# United States Patent Office 2,876,985
Patented Mar. 10, 1959

2,876,985

ROTARY VALVES FOR LABORATORY GLASSWARE AND THE LIKE

George H. Birchall, Jr., Westfield, N. J., and James A. Purdy, Fairfield, Conn., assignors to Fischer & Porter Company, Hatboro, Pa., a corporation of Pennsylvania Application June 22, 1955, Serial No. 517,214

5 Claims. (Cl. 251—192)

The present invention relates to self-lubricating taper-plug glass valves whose bodies are made of glass, as, for instance, the stopcocks used in chemical glassware and the like.

The present application is a continuation-in-part of co-pending application Serial No. 221,402, filed April 17, 1951 now Patent 2,711,846, issued June 28, 1955.

In chemical work, corrosion due to chemical interaction between the liquid being conveyed and the pipes, tubes and valves, requires glass tubing or glass valves. Fluid-tightness or gas-tightness and the nature of glass-to-glass contact requires that the relatively slidable interengaging surfaces of the glass valve-body or valve-housing and of the movable glass valve-member or "plug" shall be lubricated in relation to each other with some grease, oil or the like.

In common practice, in chemical laboratories, Vaseline or the like is used between cooperating ground glass surfaces of the valve-body and of the plug. This lubricant is required both because in the conventional glass stopcock, having a glass housing as well as a glass plug (with their cooperating faces ground to the same taper), the plug will either freeze or become difficult to rotate in the valve-housing or will leak gas or liquid, unless a lubricant is interposed and maintained between the two surfaces. Thus, the lubricant is, in a sense, an indispensable part of such glass valve. The reason for this is that two contiguous glass surfaces, however finely ground and polished, tend to bind to each other against free sliding movement, and also tend to leak gas or thin fluids, if such surfaces are dry.

As in many chemical operations or chemical work or other work in which laboratory glassware or technical glassware is used, lubricant, however slight, is an undesirable contaminant or is indeed frequently dissolved or altered by the liquid or gas passing through the valve, glass stopcocks requiring lubricants are inherently inefficient and unreliable in many uses. Thus, for instance, as soon as the lubricant is dissolved away or altered in composition by the liquid or gas passing through the valve, the stopcock will bind or freeze or leak.

The object of the present invention is to provide a stopcock which will be chemically inert in respect to virtually all known chemicals and gases at normal or elevated temperatures commonly used in laboratory work in glassware, and one which can be operated entirely dry, that is, without any lubricant whatsoever, and which will be freely revolvable without any binding or any variation in frictional engagement between the plug and the housing, even though continuously urged into wedging engagement by a steady pull of a compression spring or other resilient means applied to the end of the plug, axially thereof.

Thus, in conventional glass stopcocks it is not practical even resiliently to urge the plug into wedging engagement with the tapered valve-bore of the housing, because any steady force applied in that direction will gradually squeeze out the lubricant and will then cause the plug to bind or freeze in the valve-bore, thereby requiring the momentary dislodgement of the plug and some loss of liquid or gas and may also result in the dropping out of the plug.

In the accompanying drawings, in which like reference characters indicate like parts, Figure 1 represents a cross-sectional view of a valve representing one embodiment of the present invention, taken through the axis of the valve-plug and of the valve-housing and through the axis of the fluid-ports therethrough.

Figure 1:
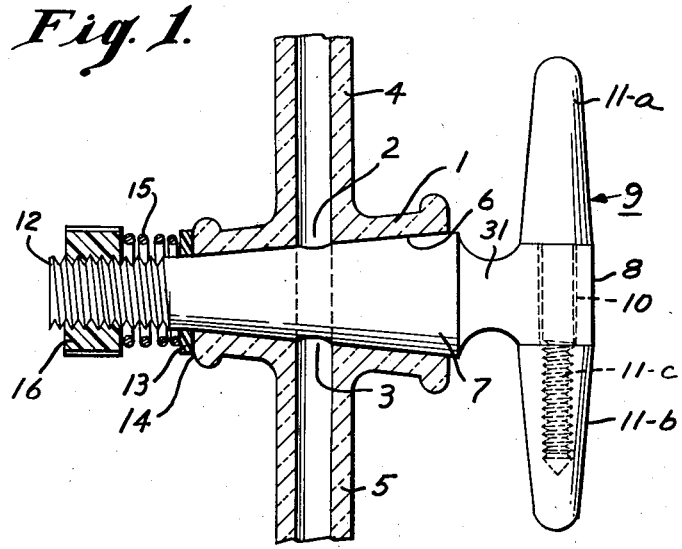

According to our invention we form a valve-housing 1, of glass, to the opposite ports 2 and 3 of which glass valve-housing 1 conductor-tubes 4 and 5 may be fused in the conventional manner, and the inner taper valve-bore 6 of which is either ground and polished or not; that is, either ground and polished to a transparency like that of a heat-glazed surface or left with an original heat-glazed surface. Thus, we may merely mold the tapered bore 6 of the housing to an accurately tapered and polished stainless steel molding plug.

In either event, however, the ratio of the change of radius of this tapered bore 6 to the length thereof is of the order of 1:6 to 1:9, and is preferably 1:8.

A tapered valve-plug 7 is constructed of a chemically inert wax-like synthetic resin stable both chemically and physically at relatively high temperatures and which is self-lubricating with respect to a heat-glazed or a transparent polished glazed surface and which is relatively form-retaining but which is nevertheless capable of yielding slightly under pressure, or capable of having its surface conform to the contiguous glass surface of the tapered bore 6 of the housing, yet without being porous; so as to form a fluid-tight seal with the taper bore 6 of the valve-housing 1 and at the same time permitting it to be readily rotatable in relation thereto while it is spring-urged or otherwise resiliently urged thereinto.

The main taper of the body of the plug 7 is the same as the taper of the valve-bore 6 of the housing 1.

The plug 7 is preferably made of polytetrahaloethylene synthetic resin, polystyrene or other high melting-point synthetic resins highly inert chemically and resistant to the action of corrosive chemicals and generally form-retaining but having a slight amount of resilient deformability and capable of yielding slightly under pressure and capable of restoring itself to its original shape when the pressure is relieved, and preferably one having a wax-like or "soapy" feel and capable of sliding or slipping readily over a glazed vitreous valve-seat surface 6 in what may be called a self-lubricating relationship therewith, and being chemically stable up to approximately 550° F. and being physically stable to at least approximately 300° F. Among such polytetrahaloethylene synthetic resins are polytetrafluoroethylene which is sold commercially by the E. I. du Pont de Nemours Company under the name of "Teflon," and polytrifluorochloroethylene which is sold commercially by the M. W. Kellogg Co. under the name of "Kel–F."

Figure 2:
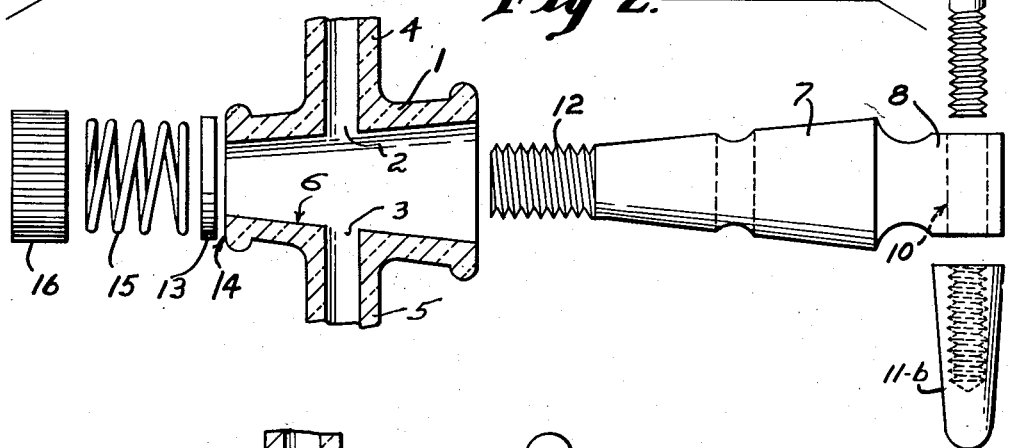
Figure 2 represents a side view of the parts of the valve.

At one end 8 of the tapered-plug 7 which projects from the housing, a transverse bar 9 is provided, which may be either made integrally with the body of the tapered-plug valve 7 (of the same material as that of said body), or which may be constructed by forming a transverse aperture 10 through the projecting end 8 of the valve-plug 7 and extending the threaded connecting stem 11–c of one of the handle members 11–a therethrough, which threaded connecting stem is then screw-threadedly engaged with the other similar and internally-threaded handle member 11–b, as shown in Figures 1 and 2, and tightened together to form a handle-bar 9.

From the other end of the plug 7 a cylindrical pluggedextension 12 projects outwardly from the valve-bore 6, and is of a diameter slightly smaller than the smallest diameter of the tapered valve-bore 6, and is threaded, as indicated in Figures 1 and 2.

A washer 13, preferably (but not necessarily) made of the same material as that of which the plug 7 is made (but, in any event, preferably a non-metallic and nonvitreous material), is provided immediately adjacent the outer end of 14 of the housing 1. A helical compression spring 15 may be provided, telescoped over the threaded extension 12 of the plug 7, and a nylon or other suitable internally-threaded and externally knurled or otherwise shaped nut 16 is then threaded onto the plug-extension 12, against the spring 15, thereby to compress it to any desired extent.

In this manner, the plug 7 will be drawn into the taper of the valve-bore 6 with whatever pressure or force may be desired to give whatever friction is desired between the plug 7 and the bore 6 of the body 1.

Thus, by tightening the nut 16, the force required to turn the valve may be increased, while by loosening the nut slightly, force required to turn the plug 7 is decreased.

Figure 3:
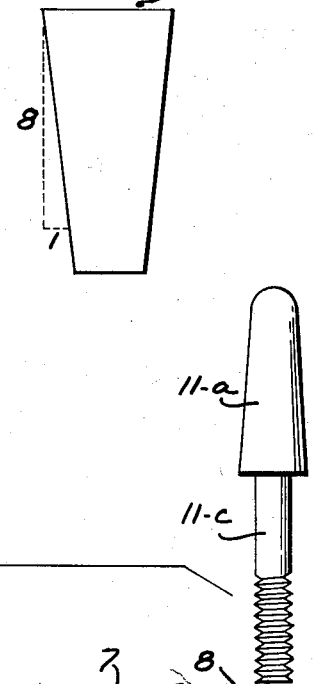
Figure 3 is a diagrammatic representation of the taper of the valve-bore and of the plug, illustrating the optimum taper.

Figure 3 illustrates the ratio of the taper of the bore 6 and of the plug 7.

We have found that a ratio substantially less than the lower limit of 1:6 of the above-indicated range (of 1:6 to 1:9 of change of radius to change of length) will not produce a sufficient contact pressure between the glass surface of the bore 6 and the contacting surface of the plug 7, to deform the plug sufficiently to make a firm fluid-tight seal, especially with thin liquids and gases, while if the ratio of the taper is substantially more than the upper limit of 1:9 of the above-indicated range, the contact-pressure will be so great as to require excessive turning force.

Figure 4:
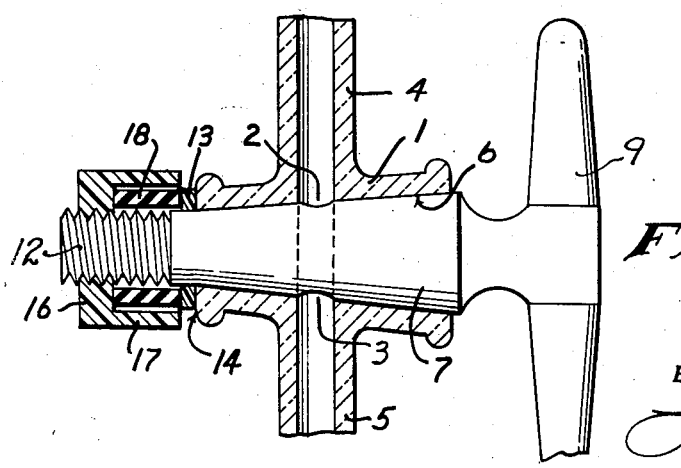
Figure 4 represents a modified embodiment of one element of the present invention.

In the modified embodiment indicated in Figure 4, the nut 16 is preferably (though not necessarily) provided with a sleeve 18, and instead of using a metallic coilspring such as the spring 15 shown in Figures 1 and 2, a resilient rubber or rubberlike tube or sleeve 18 is telescoped over the plug-extension 12, between the washer 13 and the nut 16 and within the sleeve 17 of the nut. If desired, the sleeve 17 may be extended so as to slightly overlap the outside of the washer 13, thereby completely enclosing the tube 18. Such a sleeve-bearing nut as shown in Figure 4 may also be used in conjunction with a metallic coil spring 15 shown in Figures 1 and 2.

The tapered valve-plug 17 may also be tensioned without the interposition of either the spring 15 or the resilient member 18 interposed between the nut 16 and the washer 13, but by merely bringing the nut 16 against the washer 13, because the tensioning-extension 12 is in and of itself sufficiently resilient so that when it is pulled by the nut (bearing against the washer 13) it will stretch slightly and this slight stretch, combined with the corresponding resiliency and deformability of the plug 7, will cause the plug 7 to bear radially outwardly against the tapered valve seat 6 and conform thereto so as to fit the valve seat with smooth running sealing engagement.

Figure 5:
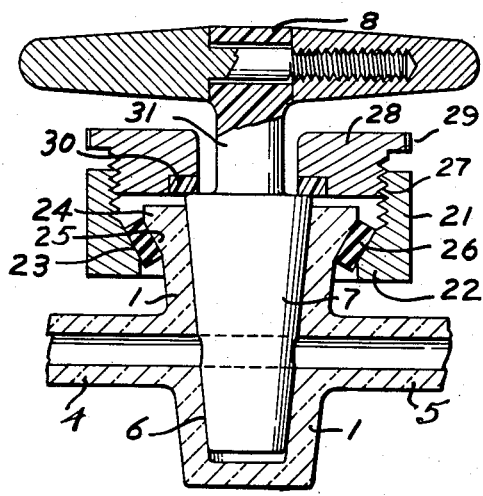
Figure 5 represents a further modified embodiment of the present invention, shown in cross-section, taken through the axis of the plug and of the valve-housing and through the axis of the fluid-ports therethrough.
Figure 6:
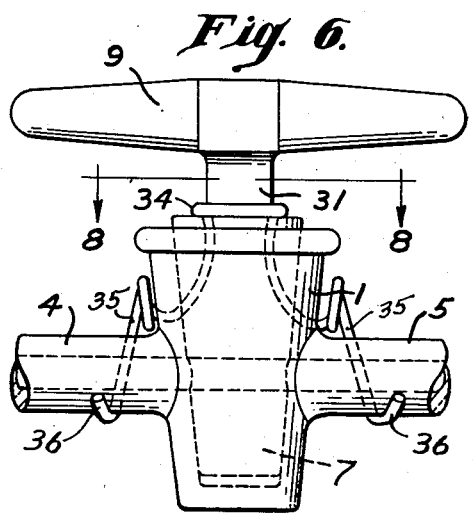
Figure 6 represents a front elevational view of a modified embodiment of the present invention.

In Figures 5 and 6 a modified embodiment of the present invention, is shown, in which a plug-retaining ring or sleeve 21 is provided, having an inturned flange 22, with an inner tapered surface 23, and in which the outer end of the housing, at the large end of the bore 6, is provided with a similar outwardly extending flange 24 having a similar tapered surface 25, the largest diameter of the surface 25 being slightly smaller than the smallest inner diameter of the taper 23, so that the sleeve 21 may be put over this tapered end of the housing. A split annular ring 26, of suitable thickness, and preferably formed of a resilient shock-absorbing material such as a rubber or rubber-like gasket material, of suitable thickness, is interposed between the two tapered surfaces 23 and 25, while the sleeve 21 is fully telescoped over the end of the body 1, in which position a sufficient clearance exists between the two tapered surfaces 23 and 25 to permit the split annular band 26 to be slipped between the two tapered surfaces. By then slightly withdrawing the sleeve 21 in relation to the housing 1, an interlocking engagement is obtained between the flanges 22 and 24, through the ring 26. The inner bore 27 of the sleeve 21 is preferably threaded. An externally-threaded collar 28 having a knurled or otherwise deformed handle-portion 29, is threaded into the sleeve 21. The compression spring or resilient washer 30 may then be interposed between the large end of the plug 7 and the collar or bushing 28, to urge the plug 7 into the tapered bore 6 of the housing 1.

In order to permit the handle end 8 of the valve-plug 7 to pass through the collar 28, the collar 28 may be split into two halves and so threaded into the sleeve 21, and the sleeve 21 may be partially slitted at spaced intervals throughout its periphery, and the so-slitted sections tensioned inwardly, firmly to hold the two halves of the collar 28, or, in the alternative, the handle 9 may be separately formed and affixed to the valve-stem 31 by having one or more flats or other keying means formed on the end of the stem 31 and the stem-receiving hole in the handle similarly shaped, so as to interlock with the handle, and then threading a nut on the outer end of the valve-stem 31.

In the alternative, the handle 9, valve-stem 31 and plug 7 may be formed integrally with each other, and a split washer placed between the split collar 28 and the spring 15, while the opening in the collar 28 is made large enough to permit the handle 9 or the valve-plug 7 to pass through it; the hole in the split-washer or two-piece washer being just small enough to accommodate the valvestem 31.

If desired, the spring 15 may be eliminated by making the split ring 26 sufficiently resilient and sufficiently thick, so that the collar 28 may directly contact the plug 7 or a washer 30 adjacent thereto, so that a slight tightening of the collar 28 will compress the ring 26, and thereby impose a resilient axial force upon the plug 7, as indicated in Figure 5.

As a further alternative, the washer 30 may be solid, but with its inner opening slightly larger than the head 8 at the end of the stem 31, so that the washer can be slipped over the head 8 when the handle members 11–a and 11–b are removed therefrom; the hole in the collar 28 also being large enough to have the head 8 pass through it.

Figure 7:
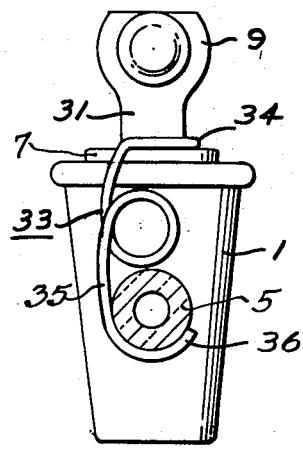
Figure 7 represents a side elevational view of the same.
Figure 8:
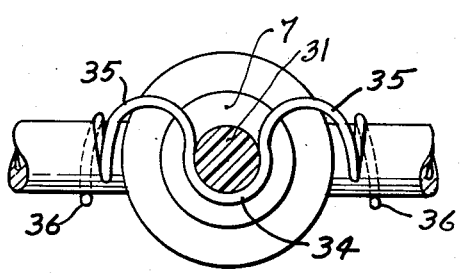
Figure 8 represents a view on line 8—8 of Figure 7.

In the embodiment shown in Figures 6, 7 and 8, a spring 33 is provided, having an upper central portion 34 in a form of an inwardly bowed U, which can be snapped over the stem 31, and having a pair of downwardly extending legs 35 with hooks or upwardly curved portions 36 to engage the tubes 4 and 5. The spring is made of a wire sufficiently flexible and resilient, that the hooks 36 can be snapped onto the tubes 4 and 5. If desired, a bend may be formed in the legs 35, to give greater resiliency and expansibility to the legs.

In both embodiments indicated in Figure 5 as well as in the embodiments indicated in Figures 6, 7 and 8, a small end of the housing 1 may be left closed, as indicated in Figures 5 and 6.

The term "glazed" as used in the claims is intended to comprehend both a transparent glazed surface as produced by holding the hot plastic glass against a highly polished stainless-steel tapered mandrel and permitting it to cool off and to "set" to the shape of such mandrel so that its bore is fire-glazed or heat-glazed, and also a smooth tapered transparent surface which may be produced by grinding and highly polishing the tapered bore of the valve-housing to a smooth transparent finish which is uninterrupted, and which hence is like a heat-glazed surface as distinguished from the more less opaque and diffusing or frosted-like surface of the tapered valve-seats of conventional glass stopcocks with tapered glass valve plugs.

The following is claimed:

1. A tapered plug-valve including a vitreous valve-housing having a glazed frusto-conical valve-bore forming a valve-seat, a fluid passageway extending through said valve-housing in a direction transversely of the axis of said valve-bore and interrupted at said valve-bore, with the interrupting ends thereof having valve-ports in said frusto-conical valve-seat, a frusto-conical valve-plug in said valve-bore having the same taper as that of said valve-bore and having a fluid passageway therethrough transversely of its axis and terminating in ports in its frusto-conical surface in operative alignment with the ports in said valve-seat and formed of a chemically inert non-porous and non-absorbent relatively hard and generally form-retaining wax-like synthetic resin which is slightly elastic under low stress and which is capable of cold-flowing under greater stress, and which is capable of sliding over a glazed vitreous surface in the manner of self-lubricating relationship therewith, said valve-plug having a coaxial tensioning extension extending from the smaller end thereof, a fastener adjustably engaging said tensioning extension and operatively interposed between said tensioning extension and the end of the valve-housing having the smaller end of the valve-bore therein, said valve-plug, tensioning extension and adjustable fastener being so arranged and related to each other that when the fastener is adjusted to exert an axial pull upon said extension it will cause the plug to bear radially outwardly against said valve-seat and to deform so as to conform to the valve-seat in sealing and turn-resistant relation thereto, and handle means on said valve-plug exteriorly of said valve housing for turning it.

2. A tapered plug valve according to claim 1 in which the valve-plug is formed of a polytetrahaloethylene.

3. A tapered plug valve according to claim 1, in which the valve-plug is formed of a polytetrafluoroethylene.

4. A tapered plug valve according to claim 1, in which the valve-plug is formed of a polytrifluorochloroethylene.

5. A tapered plug valve according to claim 1, in which the change of radius of the taper of the valve-seat and valve-plug for any given length thereof is in a ratio between 1:6 and 1:9.

References Cited in the file of this patent

UNITED STATES PATENTS

| | | |
|---|---|---|
| 512,537 | Campbell | Jan. 9, 1894 |
| 971,446 | Hawkins | Sept. 27, 1910 |
| 1,892,835 | Hamer | Jan. 3, 1933 |
| 2,412,597 | Brewer | Dec. 17, 1946 |
| 2,756,961 | Pickering | July 31, 1956 |

OTHER REFERENCES

Industrial & Engineering Chemistry, vol. 38, 1946 (TP–1–.A58), pp. 871–877, 251–368. (Copy in Scientific Library.)